United States Patent

Pierret et al.

Patent Number: 5,363,904
Date of Patent: Nov. 15, 1994

[54] SETBACK CONTROL FOR HVAC SYSTEM

[76] Inventors: Peter G. Pierret, 115 Shady La., Fayetteville, N.Y. 13066; Laurie L. Werbowsky, 137 Darlington Rd., Syracuse, N.Y. 13208; A. Bruce Buchholz, 8155 McCamidge Dr., Cicero, N.Y. 13039; Glenn D. Goodnough, 1506 Grant Blvd., Syracuse, N.Y. 13208

[21] Appl. No.: 99,796

[22] Filed: Jul. 30, 1993

[51] Int. Cl.⁵ .................................. F23N 5/20
[52] U.S. Cl. ............................ 165/2; 165/12; 236/46 R
[58] Field of Search ............... 236/46 R; 165/12, 2; 364/557

[56] References Cited

U.S. PATENT DOCUMENTS

| | | | |
|---|---|---|---|
| 4,123,739 | 10/1978 | Helms | 236/46 R |
| 4,206,872 | 6/1980 | Levine | 236/46 R |
| 4,557,317 | 12/1985 | Harmon, Jr. | 236/46 R |
| 5,244,148 | 9/1993 | Vandermeyder | 236/46 R |

Primary Examiner—William E. Wayner

[57] ABSTRACT

A setback control for an HVAC system is selectable by depressing a switch on a control panel associated with a programmed microprocessor. The programmed microprocessor is operative to thereafter change the setpoint temperature by a predefined amount each hour until a predetermined number of hours have passed. The set point temperature is thereafter held for a further hourly count before being returned to the starting setpoint temperature. The directional change in setpoint temperature is a function of whether the HVAC system is in a heating or cooling mode of operation.

12 Claims, 3 Drawing Sheets

SETBACK CONTROL FOR HVAC SYSTEM

BACKGROUND OF THE INVENTION

This invention relates to the control of temperatures during a setback period normally occurring at night. In particular, this invention relates to the automatic control of the setpoint temperature for a heating, venting and air conditioning (HVAC) system during such a period.

Thermostatic control of nighttime temperatures during normal sleeping hours is well known in the art. This is quite often accomplished by a programmable thermostat which allows a person to define one or more setback temperatures that are to be maintained for predetermined periods of time. The thermostatic control is thereafter operative to implement the setback during the predetermined periods before returning to the previous temperature or to a new temperature in the morning.

The above thermostatic control requires that programmable entries be made by a person. Each programmable entry by the person may require several steps to select and store a temperature that is to occur at a given time. The particular selection of temperatures may not have been done with regard to the need to avoid a sharp drop or rise in temperature which may produce an uncomfortable sleeping environment. The above personally programmed control may also not take into account changes in the season wherein the temperature may need to be relaxed differently when heating versus cooling is being required of the HVAC unit.

OBJECTS OF THE INVENTION

It is an object of the invention to provide a thermostatic control for a heating, venting and air conditioning system whereby the system automatically initiates a relaxation of temperature during normal sleeping hours.

It is another object of the invention to provide a controlled relaxation of temperature which does not permit a dramatic change in temperature at any point in time.

SUMMARY OF THE INVENTION

The above and other objects are achieved according to the present invention by providing an automatic setback control for a heating, venting and air conditioning system. The control is responsive to a person having selected an automatic sleep mode. The control is operative to immediately proceed to relax the current setpoint temperature a predefined amount each hour for the first four hours. The predefined amounts are either increments or decrements to the setpoint temperature depending on whether the system is in a heating or cooling mode. The setpoint temperature is thereafter held for an additional three hours before being returned to the original setpoint temperature.

BRIEF DESCRIPTION OF THE DRAWINGS

Other objects and advantages of the present invention will be apparent from the following description in conjunction with the accompanying drawings in which.

DESCRIPTION OF THE PREFERRED EMBODIMENT

Figure 1:
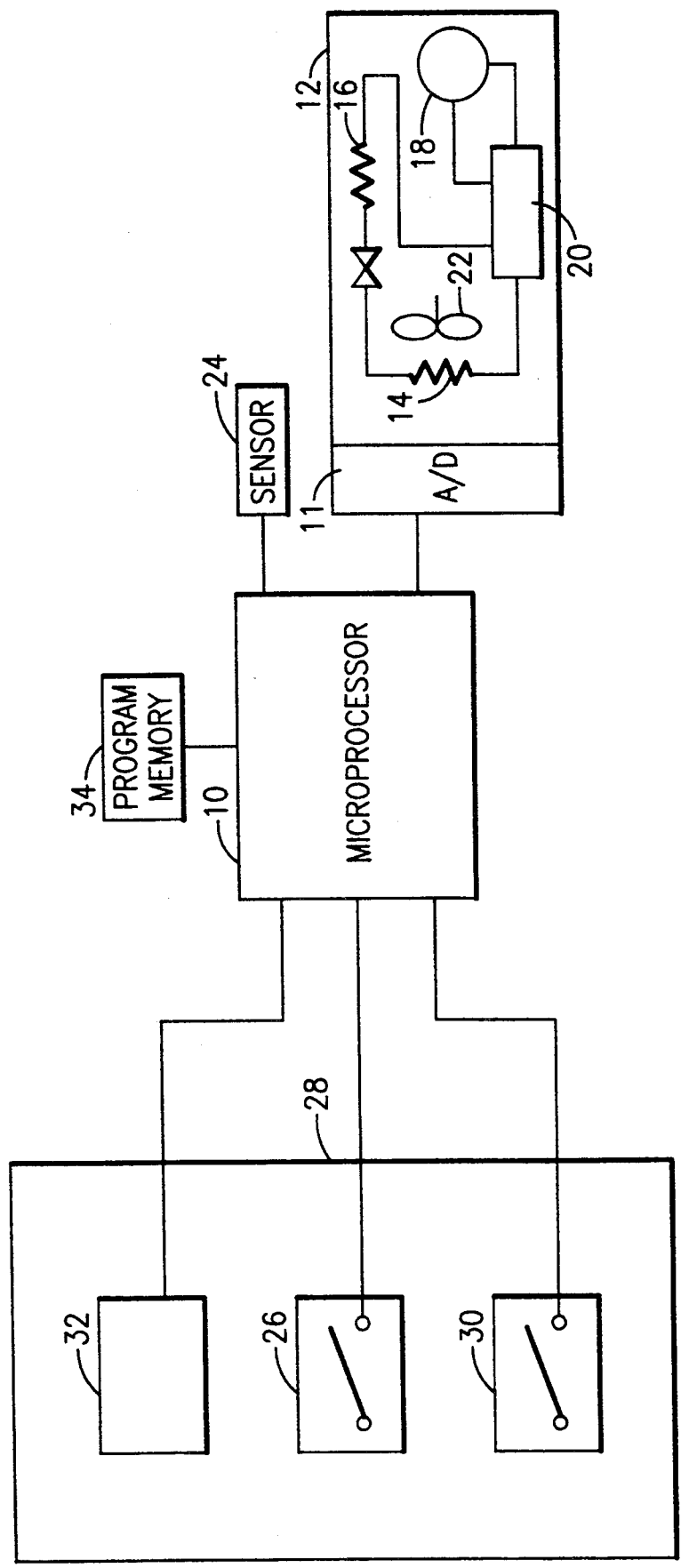
FIG. 1 illustrates a microprocessor based control system for a heating, venting and air conditioning system.

Referring to FIG. 1, a microprocessor 10 is operatively connected through an A/D interface 11 to a heating, venting and air conditioning (HVAC) unit 12. The HVAC unit 12 preferably includes an indoor heat exchange coil 14, an outdoor heat exchange coil 16, a compressor 18, a reversing valve 20 and a fan 22 for moving air over the indoor coil 14. These elements are selectively controlled by the microprocessor 10 through the A/D interface 11 in response to any variation in a temperature sensed by a temperature sensor 24 from a setpoint temperature. The selective control is pursuant to a control program well known in the art of microprocessor controlled heating, venting and air conditioning systems.

The setpoint temperature for the control program may be governed by a stored "temperature setback" program executable by the microprocessor 10. The temperature setback program is preferably activated by a "sleep" switch 26 on a control panel 28. The thus activated temperature setback program is operative to incrementally decrease or increase the setpoint temperature depending on the status of a heating/cooling mode switch 30 on the control panel 28. The thus changed setpoint temperature is displayed at all times on a display 32 of the control panel 28. The temperature setback program can be aborted anytime the displayed temperature is deemed to be too warm or too cold by turning off the sleep switch 26.

The control program and the temperature setback program are both stored in a non volatile read only memory 34 associated with the microprocessor 10. These programs are preferably stored at the time of manufacture of the control system and are unalterable by the ultimate purchaser of the heating, venting and air conditioning system. The stored programs are read and stored into main memory within the microprocessor 10 when they are to be repeatedly executed.

Figure 2A:
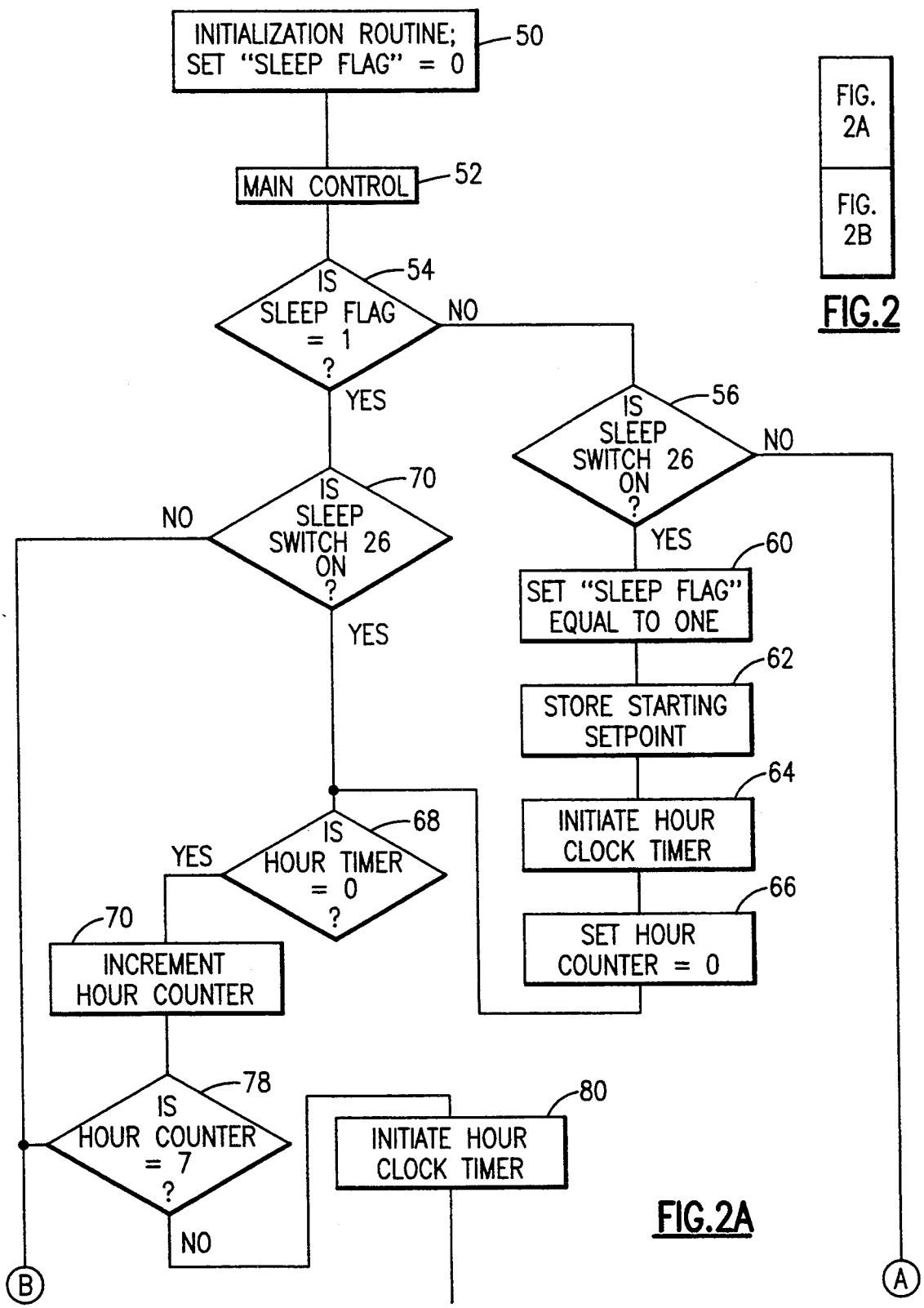
FIGS. 2A–B illustrate a temperature setback program which may be executed by the microprocessor based control system of FIG. 1 when certain switches associated with the control system are depressed.
Figure 2B:
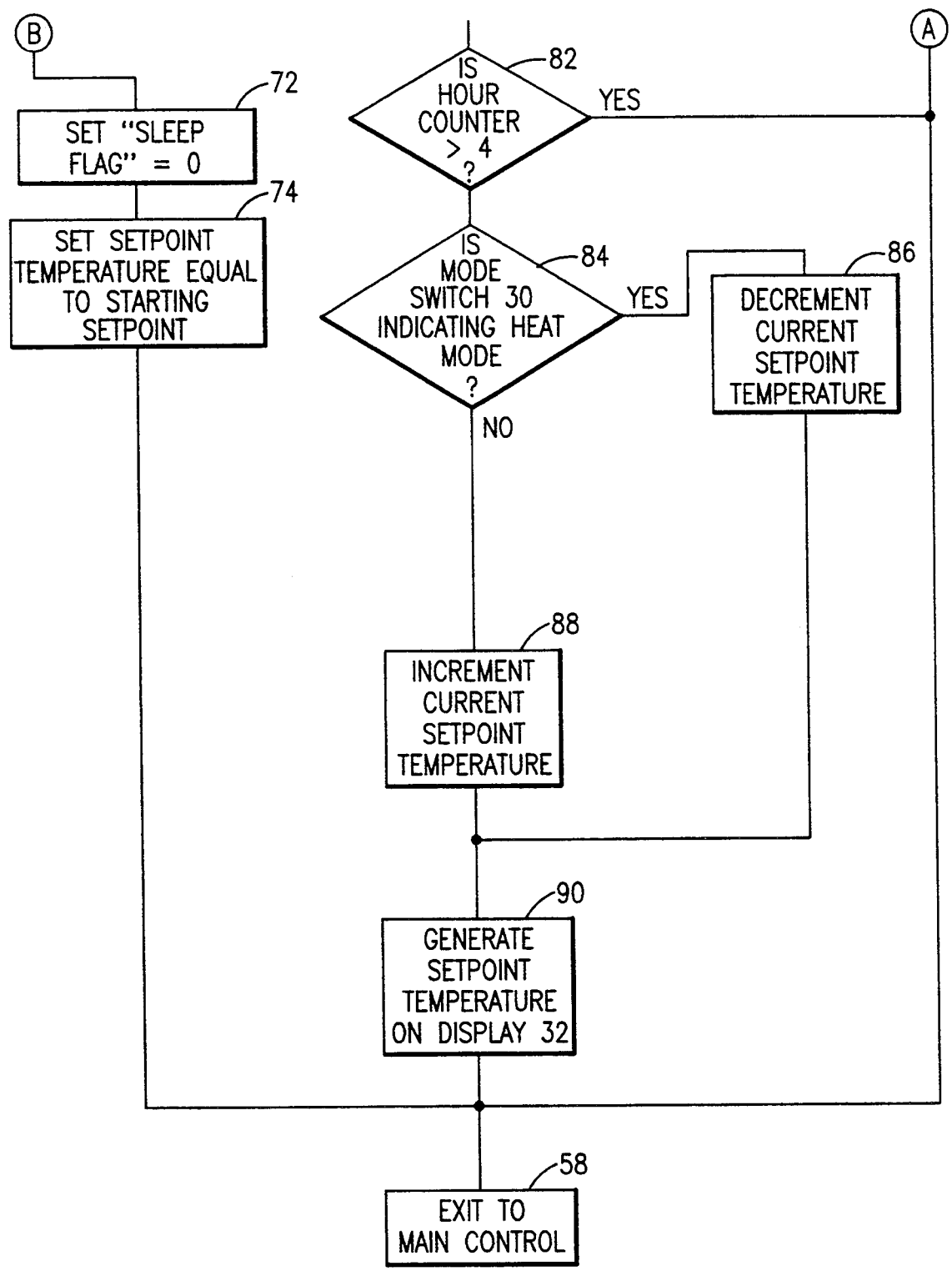

Referring to FIG. 2 a flow chart of executable steps associated with the temperature setback program is illustrated. This flow chart begins with an initialization routine 50 which occurs when the microprocessor 10 is first switched on. This initialization routine will include setting a "sleep flag" equal to zero. This sleep flag will be utilized by the temperature setback program to indicate whether the temperature setback program is in an active or inactive state. A flag value of zero indicates an inactive state. Following the initialization routine, the microprocessor proceeds to a main control 52. The main control determines when the microprocessor 10 is to execute each program that has been stored for execution by the microprocessor. In this regard, the microprocessor 10 will sequentially execute the control program for the HVAC unit 12 as well as the temperature setback program. Each program takes a minimal amount of time to execute before the microprocessor proceeds to the next program. It is to be appreciated that many programs interdependent on each other may be called and executed by the microprocessor 10.

When the temperature setback program is to be executed, the microprocessor will proceed to a step 54 and inquire as to whether the sleep flag is equal to one. Since this flag will initially be zero, the microprocessor will proceed along a "no" path to a step 56 and inquire as to whether the sleep switch 26 has been depressed. A depressed sleep switch will indicate that the occupant of the room wishes to activate the setback program of FIG. 2. If the sleep switch has not been depressed, then the setback program will not be activated and the microprocessor will proceed along a "no" path out of step 56 to a step 58 and exit back to the main control for the microprocessor 10. This will of course, prompt the microprocessor to proceed to the next executable program which may for instance be a control of the HVAC unit 12 for whatever setpoint temperature that may have been defined by the occupants of the room. Referring again to step 56, in the event that the setback program is to be activated, the microprocessor will proceed from step 56 to a step 60 and set the sleep flag equal to one. As long as the sleep flag is equal to one, the microprocessor will be executing the setback temperature routine of the setback temperature program. The microprocessor proceeds from step 60 to a step 62 and stores the starting setpoint temperature for the temperature setback routine. The starting setpoint is preferably the current setpoint that the occupant has defined for the room prior to electing the temperature setback routine by depressing the sleep switch 26. The microprocessor proceeds to a step 64 and initiates a timer clock. The timer clock will begin to count down from a predetermined clock value. The clock value is preferably one hour as indicated in step 64. The microprocessor will next proceed to set an "hour counter" equal to zero in a step 66. The microprocessor will proceed to a step 68 and inquire as to whether the hour timer has decremented to zero. In the event that the hour timer has not, the microprocessor will proceed to step 58 and exit back to main control. As has been previously discussed, main control will invoke other programs executable by the microprocessor 10 before returning to the temperature setback program of FIG. 2 and in particular to step 54. Referring to step 54, the sleep flag will have been previously set equal to one in a step 60 prompting the microprocessor to proceed to inquire in step 70 as to whether the sleep switch 26 remains on. The sleep switch 26 will be on unless the occupant of the room has elected to deactivate the setback program. Any time this occurs, the microprocessor will note the change in the sleep switch status in step 70 and proceed along a "no" path to a step 72 wherein the "sleep flag" is set equal to zero before proceeding to a step 74 and setting the setpoint temperature equal to the starting setpoint originally stored in step 62. The microprocessor will proceed from step 74 to step 58 and exit back to main control.

Referring again to step 70, if the occupant of the room has not terminated the temperature setback routine, the microprocessor will proceed along the "yes" path to step 68 and inquire as to whether the hour timer is equal to zero. When this occurs, the microprocessor will proceed to step 76 and increment the hour counter by one. The microprocessor will thereafter inquire as to whether the hour counter is equal to seven in a step 78. Since the hour counter is only at one, the microprocessor will proceed to a step 80 and again initiate the hour clock timer. The microprocessor will thereafter proceed to a step 82 and inquire as to whether the hour counter is greater than four. Since the hour counter is only at one, the microprocessor will proceed to a step 84 and inquire as to whether the mode switch 30 indicates a heating mode. If the answer is yes, the microprocessor will proceed to a step 86 and decrement the current setpoint temperature. The amount by which the setpoint temperature is decremented can be any preset amount that defines a slow relaxation of temperature for the space being heated or cooled. A change in temperature of one degree Fahrenheit has been found to be an appropriate amount per hour. Referring again to step 84, in the event that the mode switch 30 does not indicate a heat mode, the microprocessor will proceed along a "no" path to a step 88 and increment the current setpoint temperature by the predefined amount. It is hence to be appreciated that as a result of the hour counter not exceeding four, the microprocessor will either decrement the current setpoint temperature in a step 86 or increment the current setpoint temperature in a step 88 depending on whether the mode switch 30 indicates a heating mode or a cooling mode. In either event the microprocessor will proceed to a step 90 and display the incremented or decremented setpoint temperature on display 32. The microprocessor will proceed from step 90 to step 58 and exit back to the main control. It is to be appreciated that the main control will subsequently invoke the control program for the HVAC unit 12. This program will prompt the HVAC unit 12 to respond to the change in setpoint temperature. In this regard, the controlled HVAC unit will allow the temperature to rise by the predefined amount if a cooling mode is in effect or allow the temperature to fall by the predefined amount for a heating mode.

It is to be appreciated that the main control for the microprocessor 10 will continue to invoke the control program so as to respond to any changes in the setpoint temperature dictated by the setback program of FIG. 2. Such changes will occur when the microprocessor proceeds through steps 54, 70, 68, 76, 78 and 82 of the setback program and either decrements or increments the current setpoint temperature in steps 86 and 88 until the hour counter reaches four. At this point, the microprocessor will exit out of step 82 along the "yes" path and exit back to main control through step 58. The control program will at this time cause the HVAC unit 12 to maintain the current setpoint temperature established when the hour counter reached a count of four.

The temperature setback control program will continue to fully execute during this holding pattern until such time as the hour counter has been incremented to seven in step 76. The microprocessor in step 78 will note that the hour counter has reached seven and will proceed to step 72 and set the sleep flag equal to zero. The setpoint will be restored to the starting setpoint temperature in step 74 before exiting back to the main control in step 58. The control program will subsequently cause the HVAC unit 12 to restore the temperature in the controlled space to the starting setpoint temperature. This temperature will be maintained by the main control until such time as the setpoint temperature is further altered. Alteration of setpoint temperature by the temperature setback control program of FIG. 2 will of course occur in the event that the occupant of the room activates the sleep switch 26.

It is to be appreciated that a particular embodiment of the invention has been described. Alterations, modifications and improvements thereto will readily occur to those skilled in the art. For example, an alternative embodiment of the invention would be the control of setpoint temperature in a system which merely heated or cooled an interior space as apposed to having the capability to do both heating and cooling. Accordingly, the foregoing description is by way of example only and the invention is to be limited only by the following claims and equivalents thereto.

What is claimed is:

1. A system for controlling the temperature of an interior space, said system including a setpoint temperature control comprising:

a clock timer for clocking a predetermined period of time which must elapse;

triggering logic for triggering said clock timer to begin the clocking of the predetermined period;

a counter for counting the number of times the predetermined period of time has elapsed;

temperature changing logic for changing the current setpoint temperature by a predefined amount each time a change occurs in the count of the number of times the predetermined period of time has elapsed; and logic for suspending said temperature changing logic from changing the current setpoint temperature by a predetermined amount when the count of the number of times the predetermined period of time has elapsed reaches a predetermined number.

2. The system of claim 1 further comprising:

logic for restoring the setpoint temperature to the starting setpoint temperature when the count of the number of times the predetermined period of time has elapsed reaches a second predetermined number.

3. The system of claim 1 wherein said temperature changing logic for changing the current setpoint temperature by a predefined amount comprises:

at least one switch for selecting a heating or cooling mode of operation;

logic, responsive to a heating mode selection, for decreasing the current setpoint temperature by the predefined amount; and logic, responsive to a cooling mode selection, for increasing the current setpoint temperature by the predefined amount.

4. The system of claim 1 wherein said triggering logic for triggering said clock timer comprises:

a switch operative by a person wishing to initiate a predefined control of the setpoint temperature.

5. The system of claim 1 further comprising;

a switch for selecting when a predefined control of the setpoint temperature is to be initiated or terminated;

logic, responsive to said switch, for restoring the setpoint temperature to the setpoint temperature occurring at the time the predefined control was first initiated when the switch selection indicates a termination of the predefined control.

6. A system for controlling the temperature of an interior space, said system including a setpoint temperature control comprising:

a switch for selecting when a predefined control of the setpoint temperature is to be initiated; and a programmable processor connected to said switch for implementing the predefined control of the setpoint temperature when the switch selection is made, said programmable processor furthermore connected to a nonvolatile memory, said nonvolatile memory including:

clock timing logic, executable by said programmable processor, for clocking a predetermined period of time which must elapse;

counting logic, executable by said programmable processor, for counting the number of times the predetermined period of time has elapsed;

logic, executable by said programmable processor, for changing the current setpoint temperature by a predefined amount each time a change occurs in the count of the number of times the predetermined period of time has elapsed;

logic, executable by said programmable processor, for suspending said means for changing the current setpoint temperature by a predefined amount when the count of the predetermined period of time that has elapsed reaches a predetermined number.

7. The system of claim 6 wherein said nonvolatile memory furthermore includes:

logic executable by said programmable processor for restoring the setpoint temperature to the starting setpoint temperature when the count of the number of times the predetermined period of time has elapsed reaches a second predetermined number.

8. The system of claim 7 further comprising:

at least one switch, connected to said programmable processor, for selecting a heating or cooling mode of operation for a heating, venting and air conditioning system, wherein said logic within said nonvolatile memory for changing the current setpoint temperature by a predefined amount comprises:

logic, executable by said programmable processor for decreasing the current setpoint temperature by the predefined amount when a heating mode is selected; and logic, executable by said programmable processor for increasing the current setpoint temperature by the predefined amount when a cooling mode is selected.

9. The system of claim 6 wherein said nonvolatile memory furthermore includes:

control logic, executable by said programmable processor for controlling a heating, venting and air conditioning system in response to the change in setpoint temperature, whereby the control of the setpoint temperature and the control of the heating, venting and air conditioning system are both under the control of said programmable processor.

10. A process for controlling the setpoint temperature of an interior space, said process comprising the steps of:

defining a predetermined period of time which must elapse;

initiating a clocking of the predetermined period;

counting the number of times the predetermined period of time has elapsed;

changing the current setpoint temperature by a predefined amount each time a change occurs in the count of the number of times the predetermined period of time has elapsed; and suspending said step of changing the current setpoint temperature by a predetermined amount when the count of the number of times the predetermined period of time has elapsed reaches a predetermined number.

11. The process of claim 10 further comprising the step of:

restoring the setpoint temperature to the starting setpoint temperature when the count of the number of times the predetermined period of time has elapsed reaches a second predetermined number.

12. The process of claim 11 wherein said step of changing the current setpoint temperature by a predefined amount comprises the steps of:

selecting a heating or cooling mode of operation;
decreasing the current setpoint temperature by the predefined amount when the heating mode is selected; and
increasing the current setpoint temperature by the predefined amount when the cooling mode is selected.

* * * * *